United States Patent [19]

Bourdalé

[11] 3,797,663
[45] Mar. 19, 1974

[54] METHOD OF SEPARATING PARTICLES CONTAINED IN A LADEN FLUID, AND A DYNAMIC SEPARATOR FOR PERFORMING THIS METHOD

[76] Inventor: Lucien R. Bourdalé, 30, Arehue Aristide Briand, Arpajon, France

[22] Filed: Nov. 22, 1971

[21] Appl. No.: 200,846

[30] Foreign Application Priority Data
Nov. 23, 1970   France ............................... 70.41908

[52] U.S. Cl. ................... 210/78, 210/330, 210/345, 210/398, 210/402
[51] Int. Cl. ............................................ B01d 21/26
[58] Field of Search ....... 210/78, 84, 398, 402, 404, 210/407, 330, 331, 360 A, 345, 346, 347

[56] References Cited
UNITED STATES PATENTS
3,625,366   12/1971   Garrone ............................. 210/330

3,679,035   7/1972   Schmitt ........................... 210/404 X
3,606,735   9/1971   Baigas, Jr. ....................... 210/404 X
3,491,886   1/1970   Glos et al. ........................... 210/331

FOREIGN PATENTS OR APPLICATIONS
1,216,088   12/1970   Great Britain ....................... 210/78

Primary Examiner—Samih N. Zaharna
Assistant Examiner—F. F. Calvetti
Attorney, Agent, or Firm—Woodhams, Blanchard and Flynn

[57] ABSTRACT

A method and apparatus for separating particles from a fluid, wherein the particle-laden fluid is subjected to centrifugal force to cause a radial movement of the particles and fluid adjacent a radial surface of a rotating filtering partition disposed at right angles to its axis of rotation. A suction is applied through the partition to cause an axial movement of the fluid through the partition for separating the fluid from the particles.

4 Claims, 4 Drawing Figures

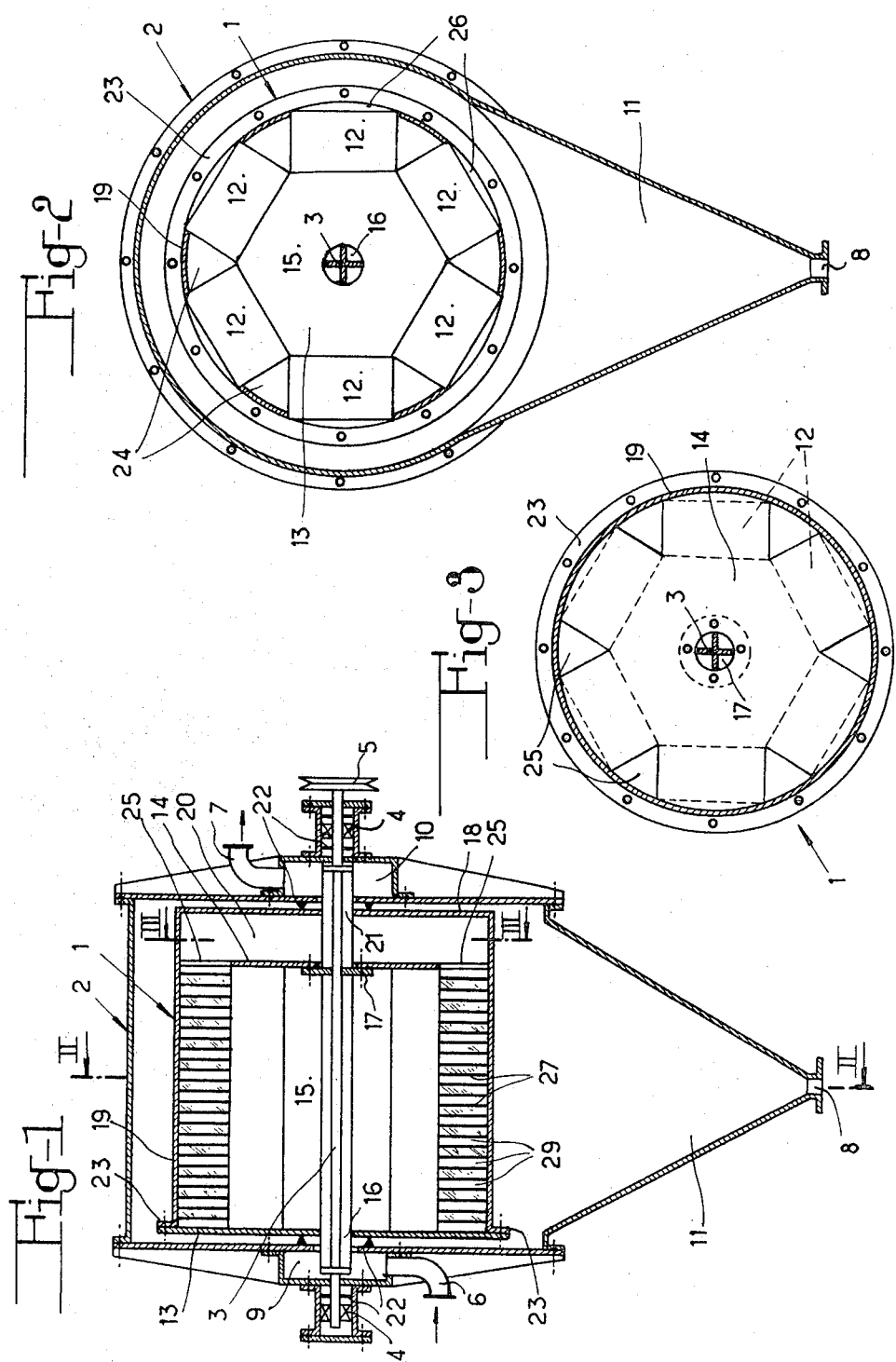

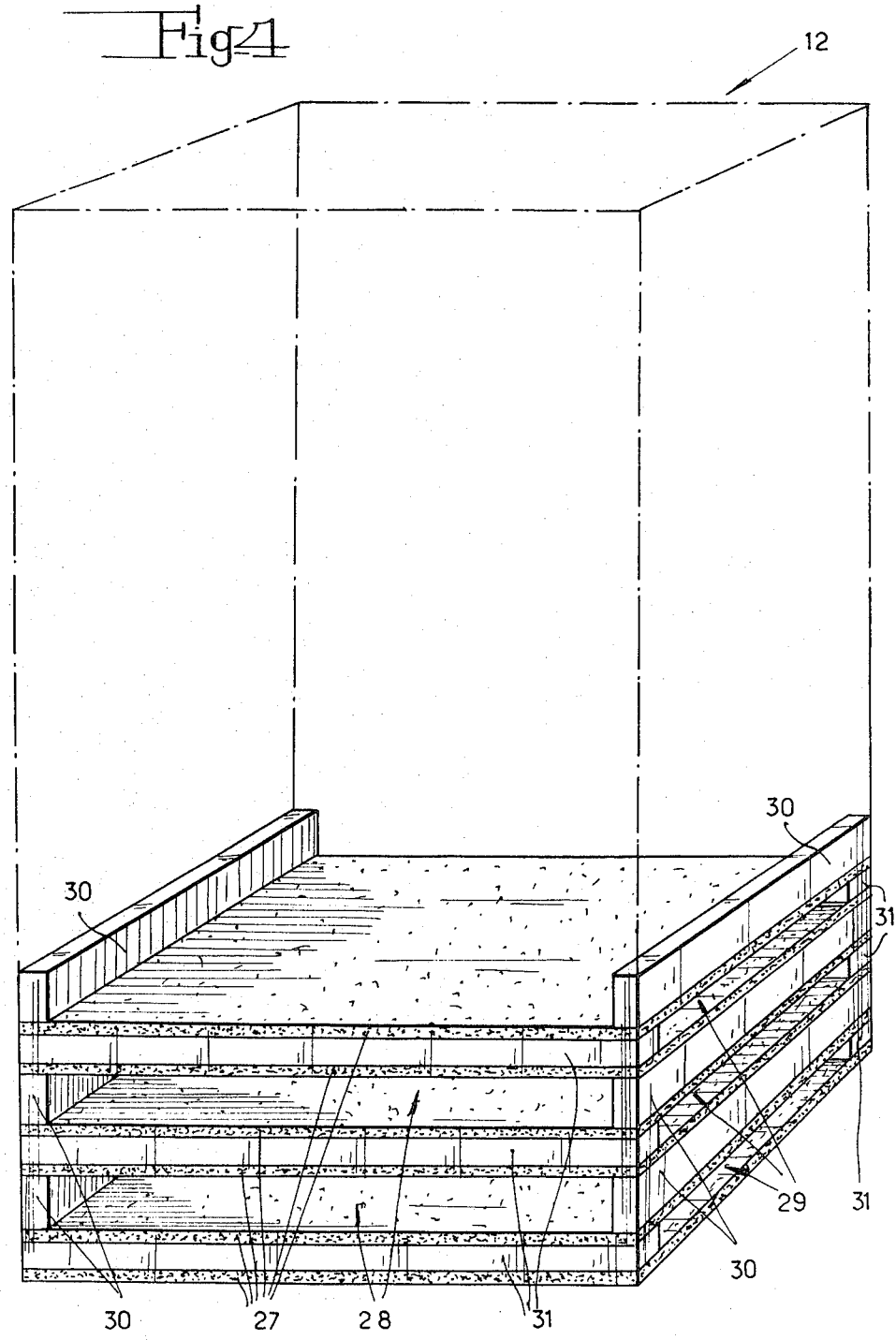

METHOD OF SEPARATING PARTICLES CONTAINED IN A LADEN FLUID, AND A DYNAMIC SEPARATOR FOR PERFORMING THIS METHOD

The present invention concerns a method of separating particles contained in a laden fluid, in which method the laden fluid is subjected to the action of a centrifugal field. The invention also relates to a dynamic separator for performing this method and of the type comprising a rotor located in a fluid-tight enclosure embodying an inlet for the particle-laden fluid, an outlet for the purified fluid and, in its lower part, an outlet for the particles, this rotor carrying a filtering cartridge of generally cylindrical form mounted coaxially with the axis of rotation of the rotor.

Known separation methods which merely employ the action of a centrifugal field are generally not completely efficient. This is the case, for example, with separators of the cyclone type. If it is required to obtain complete efficiency it is necessary also to employ a filtering partition. Then however, there arises the problem of caking, and loss of pressure varies with the thickness of the caked material. However, known arrangements employing a centrifugal field and a filtering partition do not enable suspended particles to be separated from a fluid containing them on a continuous basis and with a practically constant loss of pressure, in the most economical conditions. In fact, in all these systems, the fluid and the particles move in opposite directions at a given moment and thus cause a further loss in pressure. In certain conditions, sometimes even resulting in resonance phenomena, the loss in pressure, instead of remaining constant, increases at a very rapid rate, so that it is necessary to interrupt the circulation of the fluid from time to time in order to remove from the rotating assembly a considerable portion of the increasing mass of particles which participate in the rotary movement, and in order thus to recreate conditions in which normal resistance is offered to the fluid along its centripetal path; alternatively it may even be necessary to clean or replace the filtering cartridge. This is the case, for example, with assemblies known under the name of rotary filters. Finally, it is often necessary to resort to supplementary cleaning operations such as clearing by vibration, counter-current air-blowing, flushing of the cartridge, etc.

The aim of the present invention is to overcome these drawbacks and to achieve this the object of the invention is to provide a filtering method which is mainly characterized in that it consists in setting up a suction action which is applied through a filtering partition caused to rotate with the fluid and which occurs in a direction different from that imposed upon the particles by the centrifugal field.

A dynamic separator of the above-mentioned type for performing this method is characterized in that the filtering cartridge has at its center an upstream space, connected in a fluid-tight manner to the inlet for the laden fluid, and is constituted by a succession of filtering partitions arranged in such manner as to form, alternately, on one hand radial passages directly connecting the upstream space to the space outside the rotor and, on the other hand, transverse passages which are separated from the radial passages by filtering partitions, through which transverse passages the purified fluid is extracted as a result of a vacuum on suction created between the inlet and the outlet for the fluid, these transverse passages extending into a downstream space in the rotor connected in a fluid-tight manner to the outlet for the purified fluid incorporated in the enclosure.

Because of this arrangement, the particles suspended in the laden fluid are subjected not only to drag by the fluid, but particularly to the action of the inertia resulting from the centrifugal field of the rotor. They are thus carried directly through the radial passages from the axis of the rotor to its periphery and then accumulate by gravity in the lower portion of the enclosure at the same level as that of the outlet for the particles.

As regards the purified fluid, this first follows a centrifugal path substantially parallel with the filtering surfaces which then curves approximately through an angle of 90° at the moment when the fluid passes through these filtering surfaces into the downstream space.

Consequently, the fluid and the particles never travel in opposite directions as they do in the known arrangements, and this facilitates continuous cleaning of the filtering surfaces. The separator of the invention is thus enabled to operate on a continuous basis with a virtually constant loss of pressure.

In one embodiment of the invention, the filtering partitions are disposed in planes perpendicular to the axis of rotation of the rotor.

Furthermore, the filtering cartridge is constituted by a certain number of filtering blocks of parallelepiped form uniformly spaced along the periphery of the rotor and separated from each other by spaces in the form of triangular prisms into which the transverse passages extend, said spaces communicating with an annular chamber in the rotor, which chamber is connected in a fluid-tight manner to the outlet for the purified fluid.

An embodiment of the invention will now be described by way of example and by reference to the attached drawings, in which:

FIG. 1 is a vertical axial section through a dynamic filtering system in accordance with the invention;

FIG. 2 is a section on the line II—II of FIG. 1;

FIG. 3 is a section through part of the system and on the line III—III of FIG. 1; and FIG. 4 is a partial perspective view on a greater scale of one of the filtering blocks with which the system is equipped.

The filter illustrated in FIGS. 1 to 3 is mainly constituted by a rotor 1 fitted inside a fluid-tight enclosure 2 of generally cylindrical form, its axis extending horizontally. The rotor 1, which is likewise of cylindrical form, is solidly connected to a horizontal shaft 3 of cruciform cross-section and mounted at its ends to rotate in bearings 4 each of which is provided in the lateral cheeks of the enclosure 2. One of the ends of this cruciform shaft 3 also projects outwardly of the enclosure and carries a grooved pulley 5 which enables the rotor 1 to be turned at the required speed by means of a motor, not illustrated.

The fluid-tight enclosure 2 contains three separate openings, namely an inlet 6 for a particle-laden fluid that is to be purified, an outlet 7 for the pruified fluid, and an outlet 8 for the particles. The inlet 6 for the laden fluid extends into a first annular chamber 9, hereinafter called the "upstream chamber," formed on one of the lateral cheeks of the enclosure and disposed around the cruciform shaft 3, whereas the outlet 7 for the purified fluid extends into another annular chamber 10, hereinafter called the "downstream chamber," formed in an identical manner on the other cheek of the enclosure. The outlet 8 for the particles is located at the bottom of the enclosure 2 and at the end of a kind of hopper 11.

The rotor 1 is fitted with a filtering cartridge which is here constituted by six filtering blocks 12 of parallelepiped form fitted between two circular plates 13 and 14. These six filtering blocks are evenly spaced in a hexagonal arrangement over the periphery of the rotor and thus form at the center of the rotor an upstream space 15 surrounding the cruciform shaft 3. The plate 13, that is to say the plate which is situated at the side where the inlet 6 for the fluid is located, is mounted on the cruciform shaft 3 by way of a circular opening 16 formed at its center, this opening thus enabling the upstream chamber 9 of the enclosure to communicate directly with the upstream space 15 in the rotor. The second plate 14 also has at its center a circular opening through which the shaft 3 passes, but this opening is sealed in a fluid-tight manner by a disc 17 rigidly secured to the plate and at the same time solidly connecting the rotor to its driving shaft so that the two rotate together.

Between the plate 14 and the corresponding cheek of the enclosure 2 there is located a third circular plate 18 connected to the first two plates by the cylindrical wall 19 of the rotor. This third plate 18, together with the plate 14, defines an annular downstream chamber 20, the function of which will be explained in more detail hereinafter. The downstream chamber 20, formed in this manner in the rotor, communicates directly with the downstream chamber 10 in the enclosure 2 by means of the cruciform shaft 3 which extends through the plate 18 by way of a circular opening 21 as in the case of the plate 13.

Furthermore, sealing elements 22 are provided in line with the bearings 4 between the plates 13 and 18 respectively and the corresponding cheeks of enclosure 2, so as to provide perfectly sealed communication, on the one hand, between the inlet 6 for the laden fluid and the upstream space 15 in the rotor through the upstream chamber 9 in the enclosure, and on the other hand, between the downstream chamber 20 in the rotor and the outlet 7 for the purified fluid through the downstream chamber 10 in the enclosure. It will also be seen that the plate 13 is detachably secured to the cylindrical wall 19 of the rotor by means of a flange 23 so that filtering blocks 12 may be introduced into the interior of the rotor and replaced when necessary.

As can be clearly seen from FIG. 2, the two filtering blocks 12 are separated from each other by spaced 24 in the form of triangular prisms. These prismatic spaces 24 communicate directly with the downstream chamber 20 in the rotor by way of triangular openings 25 cut in the plate 14, which plate thus has an apertured form as illustrated in FIG. 3. It will also be seen that the cylindrical wall 19 of the rotor also contains apertures in line with the filtering blocks 12 as shown at 26 in FIG. 2, for a reason which will be explained later. Thus, between the two plates 13 and 14 material of the wall 19 is present only in line with the prismatic spaces 24 which are thus open only at those of their sides presented to the plate 14 and facing the chamber 20.

A description will now be given of the method of forming the filtering blocks 12 with which the system of the invention is equipped, by particular reference to FIG. 4 which illustrates in perspective and on a larger scale a portion of one of these blocks.

It might first be mentioned that the filtering blocks 12 are mainly constituted by a stack of rectangular filtering partitions 27 arranged perpendicularly to the axis of rotation of the rotor 1, the material and texture of these partitions being selected according to the fluid and particles to be treated. These filtering partitions 27 are separated from each other by ribs so positioned as to form, on the one hand, radial passages 28 directly connecting the upstream space 15 in the rotor to the space outside the rotor through openings 26 provided for this purpose and, on the other hand, transverse passages 29 leading directly into the prismatic spaces 24. Furthermore, these passages 28 and 29 alternate with each other in a regular manner and communicate with each other only through the filtering partitions 27. It will in fact be seen from FIG. 4 that each radial passage 28 is blocked at the sides presented to adjacent prismatic spaces 24 by two lateral ribs 30, whereas each transverse passage 29 is blocked at the side presented to the upstream space 15 in the rotor and at the side presented to the openings 26, by two lateral ribs 31.

The filtering system according to the invention and described above operates in the following manner:

As in all filtering systems, the downstream cycling of the upstream fluid, that is to say, movement of the fluid from the inlet 6 toward the outlet 7 is caused by a difference in pressure as these two openings obtained by any suitable known means. Also the rotor is caused to rotate continuously at a predetermined speed by means of the grooved pulley 5 mounted on the shaft 3 and it thus creates a centrifugal field.

The particle-laden fluid admitted through the inlet port 6 first enters the upstream annular chamber 9 in the enclosure 2 and thence passes to the upstream space 15 in the rotor 1 by way of the circular opening 16 surrounding the cruciform shaft 3.

The fluid then enters the filtering blocks 12 through the radial passages 28 and then first follows a centrifugal path substantially parallel with the filtering partitions 27. This path then curves approximately through an angle of 90° at the moment when the fluid passes through the filtering partitions into the downstream chamber 20 in the rotor 1, by passing successively through the transverse passages 29, the prismatic space 24 and the triangular openings 25 in the plate 14. From here, the fluid purified in this manner moves into the downstream chamber 10 of the enclosure by passing through the circular opening 21 surrounding the cruciform shaft 3, and is discharged through the outlet port 7.

The particles that are suspended in the fluid and are unable to pass through the filtering partitions 27 are subjected not only to the drag of the fluid but in particular to the inertia resulting from the centrifugal field of the rotor. Furthermore, this inertia increases as the particles move away from the axis of the rotor whereas drag diminishes.

Under the action of these two forces, the particles are carried directly through the radial passages 28 and the openings 26 from the axis of the rotor to the space outside the rotor and they then accumulate by gravity in the hopper 11 where they are discharged periodically or continuously by means of a known device, not illustrated, located at the outlet 8.

It will be seen from the foregoing that the fluid and the particles never travel in opposite directions as they do in known apparatus. This results in continuous and efficient cleaning of the filtering partitions 27, which enables a filtering system in accordance with the invention to operate on a continuous basis and with a practically constant loss of pressure.

It might also be pointed out that the drag exerted by the fluid comprises, on the one hand, a component which is parallel with the filtering partition and is thus a useful component, and, on the other hand, a component which is perpendicular to this wall and which is harmful since it tends to bring particles into contact with the partition or at least with the "cake" which, as is well known, forms on the partition when the pores in the partition are of smaller size than those of the largest particles entrained in the fluid. Steps should therefore be taken to reduce as much as possible the value of the harmful component in the drag, which value will mainly depend upon the area of the filtering partitions in relation to the required throughput of fluid.

As regards the useful component of the drag exerted by the fluid, it is known that it diminishes progressively with increasing distance from the axis. Normally, it fades out completely or almost completely near the periphery of the rotor since the fluid has then passed downstream through the filtering partitions. It would however be possible to bring about intentionally a certain leakage upstream in the case where inertia alone is insufficient for causing all the particles to be carried along. This leakage may then be recycled through the filter after total or partial separation of the particles carried therein, or it may simply be discharged into the atmosphere, depending upon the requirements of the particular case.

Preliminary separation may be necessary before the fluid enters the filtering zone, so as to remove excessively large particles which might block the open spaces 28 between the filtering partitions 27.

The embodiments of the invention in which an exclusive property or privilege is claimed are defined as follows:

1. A method of separating particles from a fluid laden therewith, comprising the steps of providing a rotatable filter unit having a substantially planar filtering partition, rotating said unit about an axis which is substantially perpendicular to the plane of said filtering partition, supplying a particle-laden fluid to said filter unit adjacent the radially inner end of said filtering partition, subjecting the particle-laden fluid to centrifugal force as caused by rotation of said unit to cause an outward radial movement of the particles and fluid adjacent one radial surface of the rotating filtering partition, applying a suction adjacent the other radial surface of the partition to cause movement of the fluid through the partition in a direction substantially parallel to said axis for separating the fluid from the particles, and moving the remaining particles radially outwardly past the radially outer end of said partition.

2. A dynamic separator for separating particles from a particle-laden fluid, said separator having a rotor located in a fluid-tight enclosure embodying an inlet for the particle-laden fluid, an outlet for the purified fluid and, in its lower portion, an outlet for the particles, the rotor carrying a filtering cartridge of generally cylindrical form and coaxial with the axis of rotation of the rotor, comprising the improvement wherein the filtering cartridge has at its center an upstream space connected in a fluid-tight manner to the inlet for the laden fluid, the cartridge being constituted by a succession of filtering partitions arranged to form, alternately, on one hand, radial passages directly connecting the upstream space to a space outside the rotor and, on the other hand, transverse passages which are separated from the radial passages by filtering partitions, through which transverse passages purified fluid is extracted as a result of a suction created between the inlet and the outlet for the fluid, the transverse passages extending into a downstream space in the rotor connected in a fluid-tight manner to the outlet for the purified fluid.

3. A dynamic separator according to claim 2, wherein the filtering partitions are disposed in planes perpendicular to the axis of rotation of the rotor.

4. A dynamic separator according to claim 3, wherein the filtering cartridge is constituted by a selected number of filtering blocks of parallelepiped form uniformly spaced around the periphery of the rotor and separated from each other by spaces in the form of triangular prisms into which the transverse passages extend, said spaces communicating with an annular chamber in the rotor connected in a fluid-tight manner to the outlet for the purified fluid.

* * * * *